United States Patent
Kennedy et al.

(10) Patent No.: US 8,627,107 B1
(45) Date of Patent: Jan. 7, 2014

(54) SYSTEM AND METHOD OF SECURING PRIVATE HEALTH INFORMATION

(76) Inventors: Todd Michael Kennedy, San Francisco, CA (US); Aaron Michael Lewis, Kansas City, MO (US)

(*) Notice: Subject to any disclaimer, the term of this patent is extended or adjusted under 35 U.S.C. 154(b) by 65 days.

(21) Appl. No.: 13/248,051

(22) Filed: Sep. 29, 2011

(51) Int. Cl.
    *G06F 11/30* (2006.01)
    *G06F 12/14* (2006.01)
    *H04L 29/06* (2006.01)
    *H04K 1/00* (2006.01)
    *H04L 9/00* (2006.01)
    *H04L 9/30* (2006.01)

(52) U.S. Cl.
    USPC ........... 713/189; 713/150; 713/164; 713/167; 380/28; 380/30; 380/44

(58) Field of Classification Search
    CPC ................. H04L 63/04; G06F 21/31
    USPC ........... 713/150–152, 164, 167, 189, 193; 726/26–30; 380/277–279, 282, 28, 30, 380/44
    See application file for complete search history.

(56) References Cited

U.S. PATENT DOCUMENTS

| | | | |
|---|---|---|---|
| 6,880,079 B2 | 4/2005 | Kefford et al. | |
| 7,362,869 B2 | 4/2008 | Landrock | |
| 7,590,759 B2 | 9/2009 | Omar et al. | |
| 7,856,100 B2* | 12/2010 | Wang et al. | 380/30 |
| 8,515,058 B1* | 8/2013 | Gentry | 380/28 |
| 8,565,435 B2* | 10/2013 | Gentry et al. | 380/277 |
| 2002/0143574 A1* | 10/2002 | Karras et al. | 705/2 |
| 2006/0245587 A1* | 11/2006 | Pinkas et al. | 380/28 |
| 2008/0294909 A1* | 11/2008 | Ostrovsky et al. | 713/189 |
| 2009/0112882 A1 | 4/2009 | Maresh et al. | |
| 2009/0268908 A1* | 10/2009 | Bikel et al. | 380/255 |
| 2010/0185847 A1* | 7/2010 | Shasha et al. | 713/150 |
| 2010/0325427 A1 | 12/2010 | Ekberg et al. | |
| 2011/0060901 A1 | 3/2011 | Pastoriza et al. | |
| 2011/0060917 A1 | 3/2011 | Pastoriza et al. | |
| 2011/0060918 A1 | 3/2011 | Pastoriza et al. | |
| 2011/0110525 A1* | 5/2011 | Gentry | 380/285 |
| 2011/0211692 A1 | 9/2011 | Raykova et al. | |
| 2011/0283099 A1* | 11/2011 | Nath et al. | 713/150 |
| 2012/0054485 A1* | 3/2012 | Tanaka et al. | 713/150 |

OTHER PUBLICATIONS

Gentry and Halevi, Implementing Gentry's Fully Homomorphic Encryption Scheme, Feb. 4, 2011, IBM Research.
Stehle and Steinfeld, Faster Fully Homomorphic Encryption, 2010, Advances in Cryptology—ASIACRYPT 2010, v. 6477, pp. 377-394.
Smart and Vercauteren, Fully Homomorphic Encryption with Relatively Small Key and Ciphertext Sizes, 2009, Cryptology ePrint Archive.
Benaloh et al., Patient Controlled Encryption: Ensuring Privacy of Electronic Medical Records, Nov. 2009, CCSW'09.
Gentry, A Fully Homomorphic Encryption Scheme, Sep. 2009, Stanford University Department of Computer Science (Dissertation).

* cited by examiner

*Primary Examiner* — Tae Kim (57) ABSTRACT

A system and method for securing private health information collected by a covered entity. The system and method comprises a key generation module configured to generate a public key and a private key compatible with a fully homomorphic encryption scheme. The patient's private health information, having been encrypted using the public key, can be processed by business associates without decrypting it, yielding an encrypted result. Only the holder of the unencrypted private key can decrypt the encrypted private health information and the encrypted result. The invention ensures that business associates can process private health information and return a result without accessing the private health information.

9 Claims, 8 Drawing Sheets

SYSTEM AND METHOD OF SECURING PRIVATE HEALTH INFORMATION

BACKGROUND OF THE INVENTION

1. Field of the Invention

This invention relates to the field of secure processing of private health information.

2. Description of the Background Art

Medical professionals and institutions often transmit patients' private health information over open networks to third party business associates, who process that information in order to provide a variety of services. These services include, among other things, claims processing or administration; data analysis, utilization review; quality assurance; benefit management; practice management; repricing; facilitation of health information exchange organizations and regional health information organizations; e-prescribing; providing personal health records; data aggregation; and performing accounting, billing, actuarial, and consulting services.

Various rules and regulations require medical professionals and institutions to adopt certain authorization and authentication safeguards to protect the confidentiality of patients' private health information when transmitting it over open networks. For example, the Health Insurance Portability and Accountability Act (HIPAA) requires certain health care providers, health care clearinghouses, and health plans ("covered entities") to encrypt private health information using secure TCP/IP network encryption technology, such as Secure Socket Layer (SSL) encryption. In addition, a covered entity may disclose private health information to a business associate only after obtaining satisfactory assurances that the business associate will appropriately safeguard the information.

Unfortunately, even with these safeguards, the security of private health information transmitted to third parties is too often compromised. Indeed, a recent survey demonstrated that 39% of security breaches are caused by third parties entrusted with sensitive data. (See 2010 Annual Study: U.S. Cost of a Data Breach, Symantec Corporation (March 2011).) In addition to exposing covered entities and business associates to liability, these security breaches undermine important objectives of the health care system by discouraging patients from disclosing their private information to covered entities.

Figure 1:
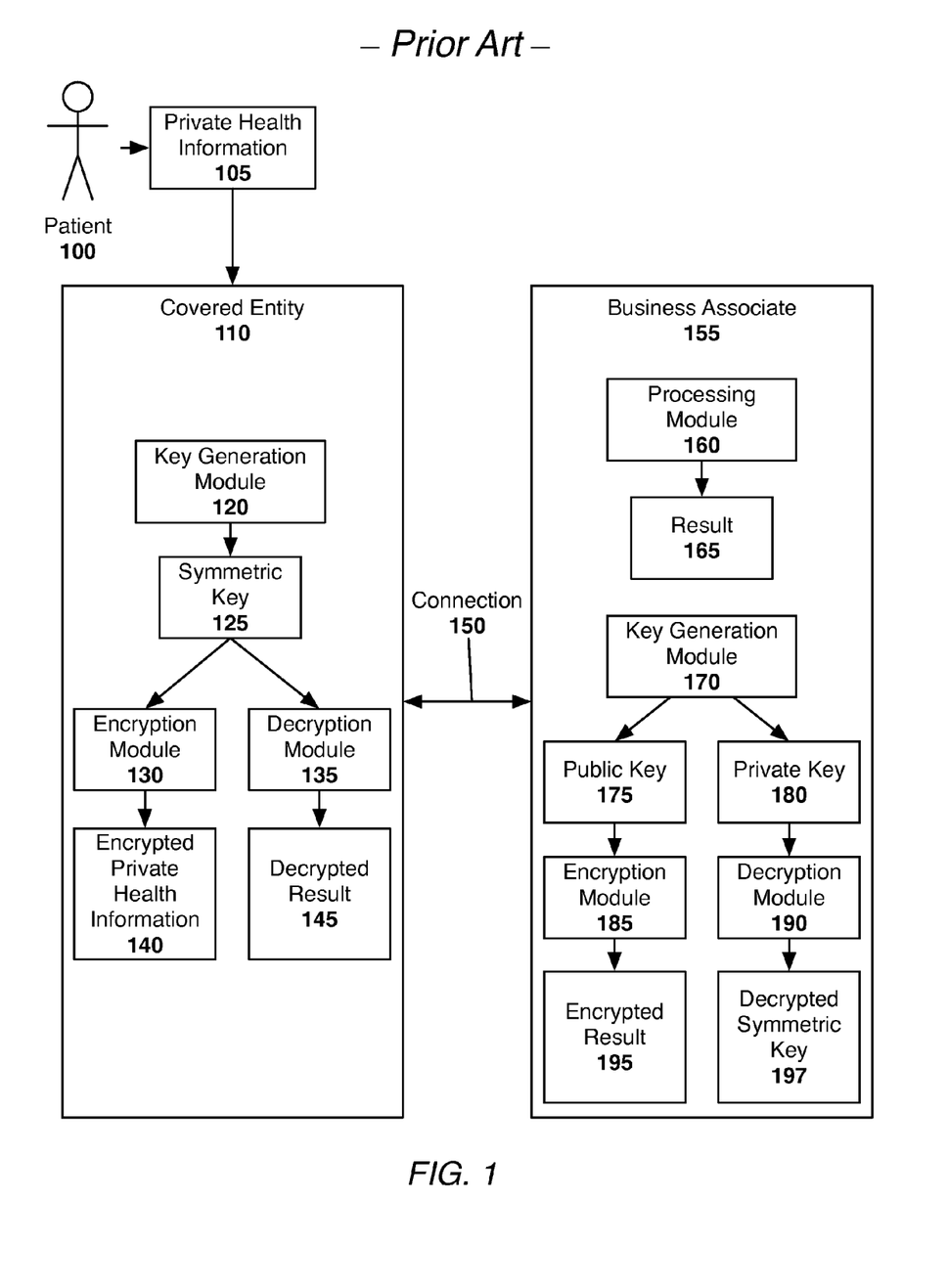
FIG. 1 depicts a system architecture that is exemplary of the prior art.
Figure 2:
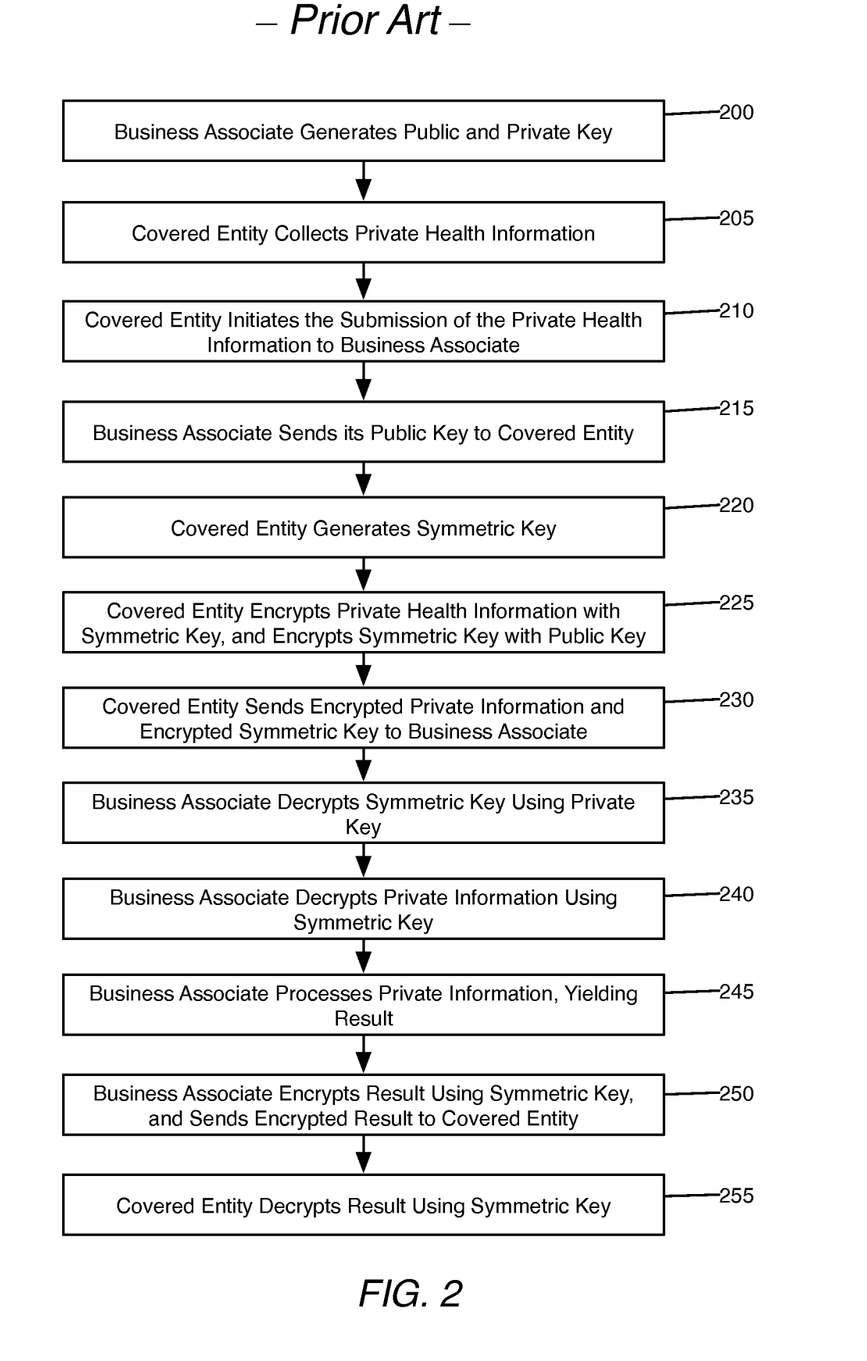
FIG. 2 depicts a flow chart that is exemplary of the prior art.

An illustrative prior art system for enabling covered entities to transmit private health information to business associates is depicted in FIGS. 1 and 2.

At step 200, the key generation module 170 of the business associate 155 generates a public key 175 and private key 180 according to an asymmetric key algorithm. As would be appreciated by one of skill in the art, there are a variety of asymmetric key algorithms, such as the RSA algorithm, the ElGamal algorithm, and the Paillier algorithm.

At step 205, the covered entity 110 collects private health information 105 of the patient 100. The private health information 105 may be provided directly by the patient 100 and entered into a computer system of the covered entity 110, or it may be collected from the patient 100 using a modality such as a CT scan device, or by a medical professional involved in the care and/or health records of the patient. The private health information 105 may be stored and transferred according to the Digital Imaging and Communications in Medicine (DICOM) standard, published by the American College of Radiology and the National Electronic Manufacturers Association. Medical images, which may also constitute private health information, may be stored and retrieved using a Picture Archiving and Communication System (PACS).

At step 210, the covered entity 110 initiates the submission of the private health information 105 to the business associate 155. Submission of this information can be accomplished using software, such as an application programming interface (API) over any standard network protocol.

At step 215, the business associate 155 sends the public key 175 to the covered entity 110.

At step 220, the key generation module 120 of the covered entity 110 generates a symmetric key 125 according to a symmetric key algorithm such as Blowfish, Twofish, or Serpent. In step 225, the encryption module 130 of the covered entity 110 encrypts the private health information 105 with the symmetric key 125, and encrypts the symmetric key 125 with the public key 175 provided by the business associate 155. The encrypted private health information, along with the encrypted symmetric key, is sent to the business associate 155 over connection 150 in step 230. In step 235, the decryption module 190 of business associate 155 uses the private key 180 to decrypt the symmetric key 125. The decrypted symmetric key 125 is then used by decryption module 190 of the business associate 155 to decrypt the private health information 105 in step 240.

Once the private health information 105 has been decrypted, it can be processed by the processing module 160 of the business associate 155 at step 245, yielding result 165. The business associate 155 may perform a variety of operations on the private health information 105, such as statistical analysis.

In step 250, the encryption module 185 of the business associate 155 uses the symmetric key 125 to encrypt the result 165 that was yielded from the processing module 160, yielding an encrypted result 195. The business associate 155 then sends the encrypted result 195 to the covered entity 110 over connection 150. Finally, at step 255, the decryption module 135 of the covered entity 110 uses the symmetric key 125 to decrypt the encrypted result 195, yielding a decrypted result 145 that can be accessed by the covered entity 110, the patient 100, or both.

Under this and other prior art methods, a covered entity who wants to take advantage of the services offered by a business associate must provide that business associate with the symmetric key so that the business associate can decrypt the encrypted private health information and perform the requested operations on that private health information. This is disadvantageous because covered entities often do not know the precise security policies and practices of business associates, or the identities and trustworthiness of the individuals responsible for administering the operations of the business associates. Given the potentially severe penalties associated with security breaches, covered entities are often reluctant to share private health information with business associates, and may decide to forego the valuable services that certain business associates offer. Alternatively, covered entities may devote significant resources to investigate the security policies of a business associate.

What is needed is an efficient system and method for enabling business associates to process private health information collected by covered entities without enabling business associates to access that information.

SUMMARY OF THE INVENTION

The present invention is a system and method that enables covered entities to send encrypted private health information of patients to business associates who may efficiently perform operations on that encrypted information, without requiring the covered entities to disclose the contents of the private health information or the unencrypted private key that could be used to decrypt that private health information. The invention utilizes a fully homomorphic encryption scheme, so that any operation performed on the encrypted private health information yields an encrypted result that cannot be decrypted without the unencrypted private key.

In particular, the covered entity generates a public key and a private key compatible with a fully homomorphic encryption scheme, and then uses the public key to fully homomorphically encrypt private health information of a patient. The covered entity then sends the fully homomorphically encrypted private health information to a business associate, who performs operations on the encrypted private health information, yielding an encrypted result. Because the business associate lacks the unencrypted private key, the business associate is unable to access the private health information.

By providing a mechanism for efficiently processing the private health information of covered entities' patients while maintaining the confidentiality of that information, the present invention benefits covered entities, business associates, and patients. The invention benefits covered entities by enabling them to receive valuable services offered by business associates without requiring the covered entities to investigate the business associates' security policies. The invention also benefits covered entities by lowering or eliminating their exposure to liability associated with security breaches by business associates. Because only the holder of the unencrypted private key can decrypt the private health information and the encrypted results of processing that information, covered entities need not fear untrusted business associates, or unknown third parties, accessing that information. Nor do covered entities or patients need to fear computer hackers breaking into the networks of business associates to retrieve private health information. Because only encrypted information is provided to business associates, hackers could, at worst, retrieve from such business associates encrypted information without the corresponding unencrypted private key.

Similarly, the invention benefits business associates by enabling them to spend fewer resources on security. Because business associates receive only encrypted information without the corresponding unencrypted private key, business associates need not develop elaborate security systems to protect the confidential information of covered entities' patients. Similarly, the invention will enable business associates to reduce or eliminate their exposure to liability associated with security breaches. In addition, the invention benefits business associates by providing them with more business, because covered entities who normally would not trust third parties with private health information can be assured that their information will be secure.

The invention also benefits patients by protecting the confidentiality of their private health information, by making the valuable services provided by business associates more widely available, and by reducing or eliminating medical care costs associated with investigating the security policies of business associates.

These and other advantages of one or more aspects of the invention will become apparent from consideration of the detailed description and accompanying drawings.

BRIEF DESCRIPTION OF THE DRAWINGS

The invention is illustrated by way of example, and not by way of limitation, in the figures of the accompanying drawings.

DETAILED DESCRIPTION OF THE INVENTION

The preferred embodiment of the present invention will be described with reference to FIGS. 3 and 4.

Figure 3:
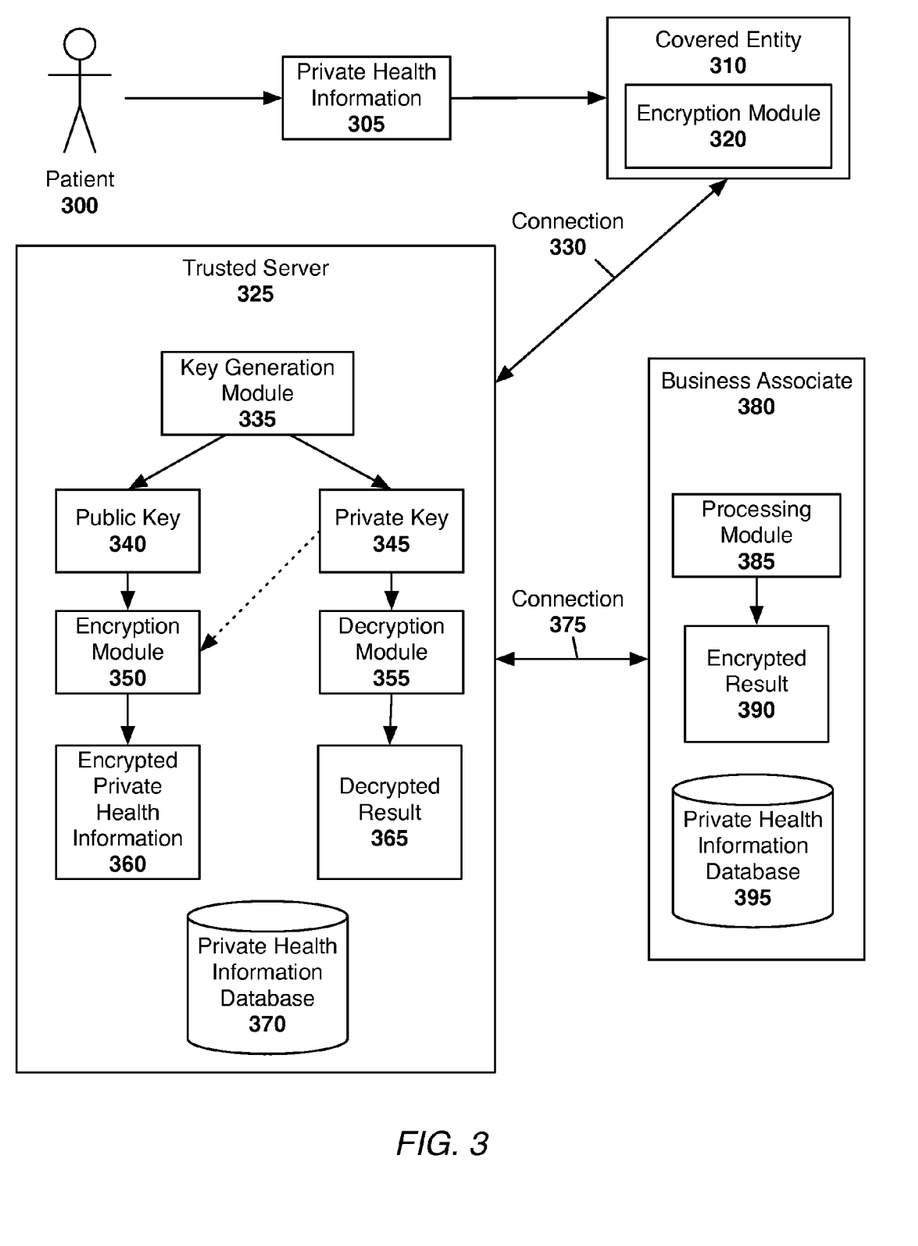
FIG. 3 depicts a system architecture according to the preferred embodiment of the present invention.
Figure 4:
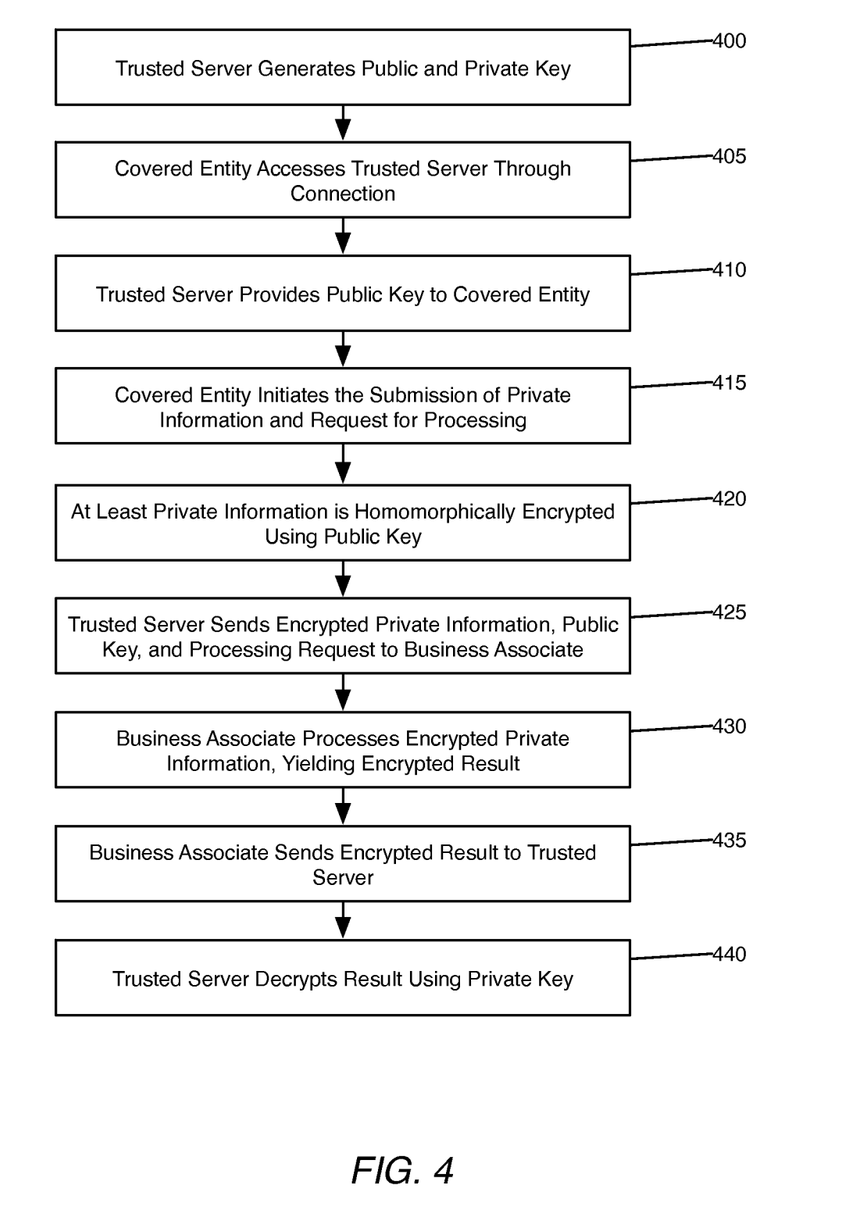
FIG. 4 depicts a flow chart according to the preferred embodiment of the present invention.

As depicted in FIG. 3, the patient 300 possesses private health information 305, which is provided to or collected by the covered entity 310. The private health information 305 may be any private information of the patient, such as information relating to the patient's physical or mental health or condition, the care provided to the patient, demographic information, or information regarding the patient's payment for care. The covered entity 310 may be any person or entity that collects private health information of patients, such as a health care provider, a medical professional, a health care clearinghouse, or a health plan. The covered entity 310 wishes to take advantage of the services offered by the business associate 380. The business associate 380 may offer any number of services or software applications relating to the processing of private health information. For example, the business associate 380 may offer software applications for claims processing or administration; data analysis, utilization review; quality assurance; benefit management; practice management; repricing; facilitation of health information exchange organizations and regional health information organizations; e-prescribing; providing personal health records; data aggregation; and performing accounting, billing, actuarial, and consulting services.

In order to take advantage of the services or software applications offered by the business associate 380 without disclosing private health information 305 to the business associate 380, the covered entity 310 utilizes a trusted server 325 to fully homomorphically encrypt the private health information 305. A fully homomorphic encryption scheme is described in Craig Gentry, *A Fully Homomorphic Encryption Scheme*, Dissertation submitted to the Department of Computer Science and the Committee on Graduate Studies of Stanford University, September 2009, as well as Craig Gentry and Shai Halevi, *Implementing Gentry's Fully-Homomorphic Encryption Scheme*, IBM Research, Feb. 4, 2011. These documents are incorporated by reference into this specification for all purposes.

The trusted server 325, which may be a cluster of servers, has sufficient processing power to perform fully homomorphic encryption of private health information 305. The processing power required is dependent on the length of the private health information 305, the speed at which the private health information 305 must be encrypted, and the level of security desired. The trusted server 325 may be operated by any entity or individual, including the covered entity 310.

At step 400, the key generation module 335 of the trusted server 325 generates a public key 340 and private key 345 compatible with a fully homomorphic asymmetric key encryption scheme.

At step 405, the covered entity 310 accesses the trusted server 325 through connection 330. Connection 330 may be an internet connection, wireless connection, satellite connection, network connection, application programming interface ("API") provided by either the trusted server 325 or the business associate 380, or any other connection accomplished using standard protocols. The covered entity 310 may access the trusted server 325 by means of an application developed by the operator of trusted server 325, by means of an internet browser, or any other means that would be appreciated by one of skill in the art.

At step 410, the trusted server 325 provides the public key 340 generated by the key generation module 335 to the covered entity 310.

At step 415, the covered entity 310 initiates the submission of private health information 305 and a request for processing that information to the trusted server 325. The private health information 305 may have been collected from the patient 300 in written form, by using a modality such as a CT scan, or by a medical professional involved in the care and/or health records of the patient 300. Alternatively, the private health information 305 may have been collected from an authorized source other than the patient 300, such as a different covered entity. The private health information 305 may be stored and transferred according to the Digital Imaging and Communications in Medicine (DICOM) standard, published by the American College of Radiology and the National Electronic Manufacturers Association. Medical images, which may also constitute private health information 305, may be stored and retrieved using a Picture Archiving and Communication System (PACS). The transmission of the private health information 305 to the trusted server 325 may be initiated a variety of ways, depending on the needs of the covered entity 310 and the service requirements of the business associate 380 and/or the trusted server 325. For instance, if the covered entity 310 desires to have the private health information 305 processed quickly, the covered entity 310 may initiate the encryption and transmission of the private health information 305 once it is collected. In that case, the transmission may be initiated manually by a medical professional or other agent of the covered entity 310, or automatically by software associated with the computer network or modalities of the covered entity 310. Alternatively, if the covered entity 310 desires to have the private health information 305 processed according to a predetermined schedule, the covered entity 310 may deploy a software application, such as a time-based job scheduler like cron, to initiate the encryption of the private health information 305, transmission of private health information 305, and/or transmission of the request, at the appropriate time.

The private health information 305 may be encrypted by the encryption module 320 of the covered entity 310 using any known key algorithm, such the symmetric key algorithms Blowfish, Twofish, or Serpent, before it is sent to the trusted server 325. Accordingly, the term "private health information," as used herein and in the claims, may refer to unencrypted or encrypted private health information, as the context permits.

At step 420, the encryption module 350 of the trusted server 325 uses a fully homomorphic encryption scheme to fully homomorphically encrypt private health information 305 (and, if required by the applicable homomorphic encryption scheme, one or more instances of private key 345) using at least one instance of public key 340, yielding encrypted private health information 360. Accordingly, as used herein and in the claims, the terms "encrypted private health information" and "fully homomorphically encrypted private health information" may refer to only private health information 305 that has been encrypted, or to both private health information 305 in encrypted form and one or more instances of private key 345 in encrypted form, as the context permits.

At step 425, the trusted server 325 sends the fully homomorphically encrypted private health information 360, public key 340, and a request for processing the fully homomorphically encrypted private health information 360 over connection 375 to the business associate 380. The business associate 380 may be any entity other than the patient 300 or covered entity 310 that operates one or more computer servers capable of processing fully homomorphically encrypted private health information. Connection 375 may be an internet connection, wireless connection, satellite connection, network connection, application programming interface ("API") provided by either the trusted server 325 or the business associate 380, or any other connection accomplished using standard protocols. As would be appreciated by one of skill in the art, the public key 340, the encrypted private health information 360, and the request for processing the encrypted private health information 360 could be sent to the business associate 380 separately, or simultaneously, and any or all could be in a compressed format to make their transmission more efficient.

After the business associate 380 receives the public key 340, encrypted private health information 360, and the request for processing the encrypted private health information 360, the processing module 385 of the business associate 380 processes the encrypted private health information 360 in accordance with the request using one or more functions at step 430. The processing of the encrypted private health information 360 may also be conducted according to a predetermined schedule by using software such as a time-based job scheduler like cron. Because the business associate 380 does not have access to the unencrypted private key 345, the business associate 380 cannot decrypt the encrypted private health information 360. Nevertheless, because the private health information has been encrypted with a fully homomorphic encryption scheme, the encrypted private health information 360 can be processed with any number of functions without decrypting it. These functions could be quite basic, such as performing simple mathematical operations like addition and multiplication, or rather complex, such as statistical analysis or string manipulation. The output of the processing step 430 is an encrypted result 390. This encrypted result 390, like the encrypted private health information 360, is encrypted according to the public key 340, and can be decrypted only by using the private key 345. Accordingly, the business associate 380 cannot decrypt the encrypted result 390.

The business associate 380 sends the encrypted result 390 to the trusted server 325 at step 435. If desired, the business associate 380 may store the encrypted result 390, the encrypted private health information 360, and/or the request in the private health information database 395 for future use.

At step 440, the trusted server 325 decrypts the encrypted result 390 using the private key 345, yielding a decrypted result 365. The trusted server 325 can then make appropriate use of the decrypted result 365. For example, the trusted server 325 can send the decrypted result 365 to the covered entity 310 over a secure connection, so that the covered entity 310 can use the decrypted result 365 for the benefit of the patient 300, for administrative purposes, or for improving the overall quality of the services provided by the covered entity 310. Alternatively, the trusted server 325 may utilize the decrypted result 365 to perform additional processing as required by the covered entity 310. The trusted server 325 may also use the private health information database 370 to store the private health information 305, the encrypted private health information 360, the encrypted result 390, or the decrypted result 365, for future use.

Figure 5:
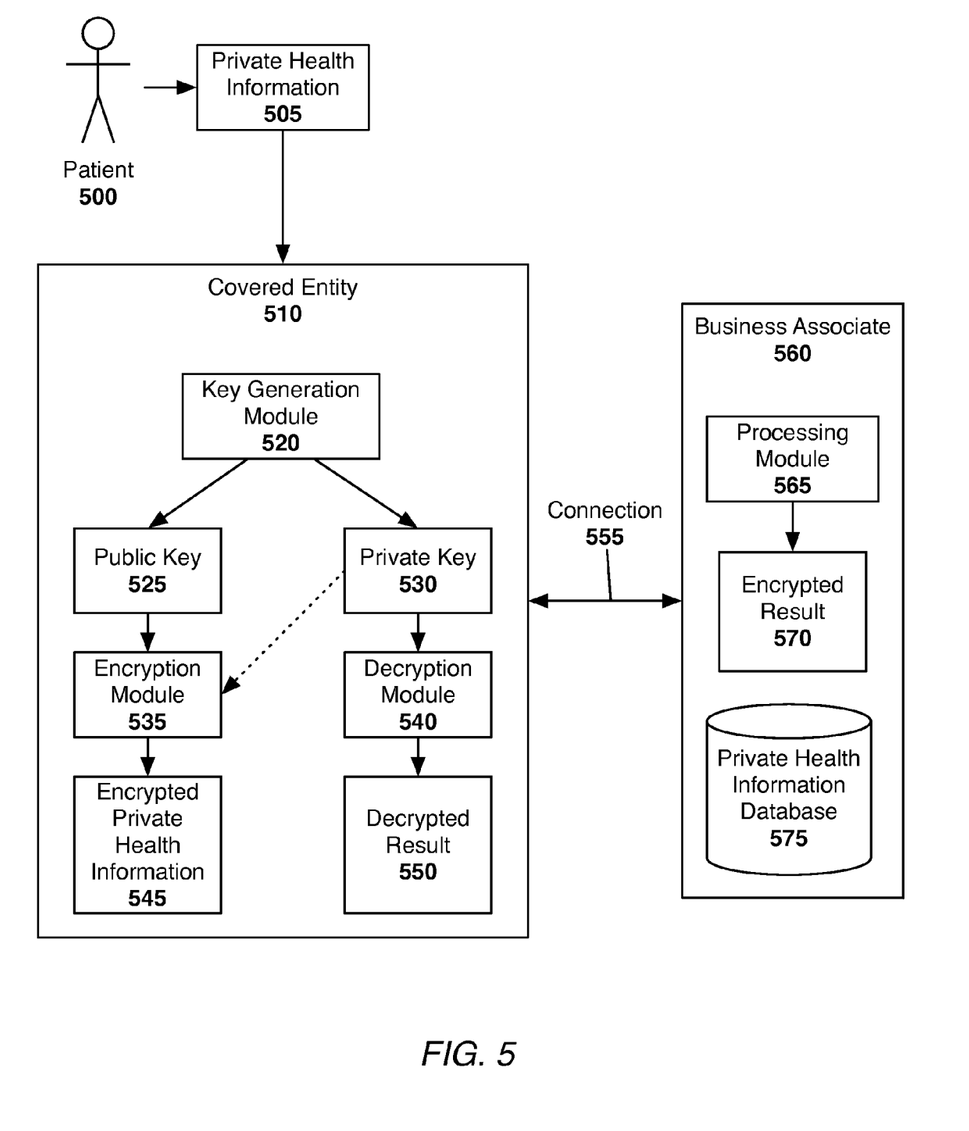
FIG. 5 depicts a system architecture according to an alternative embodiment of the present invention.
Figure 6:
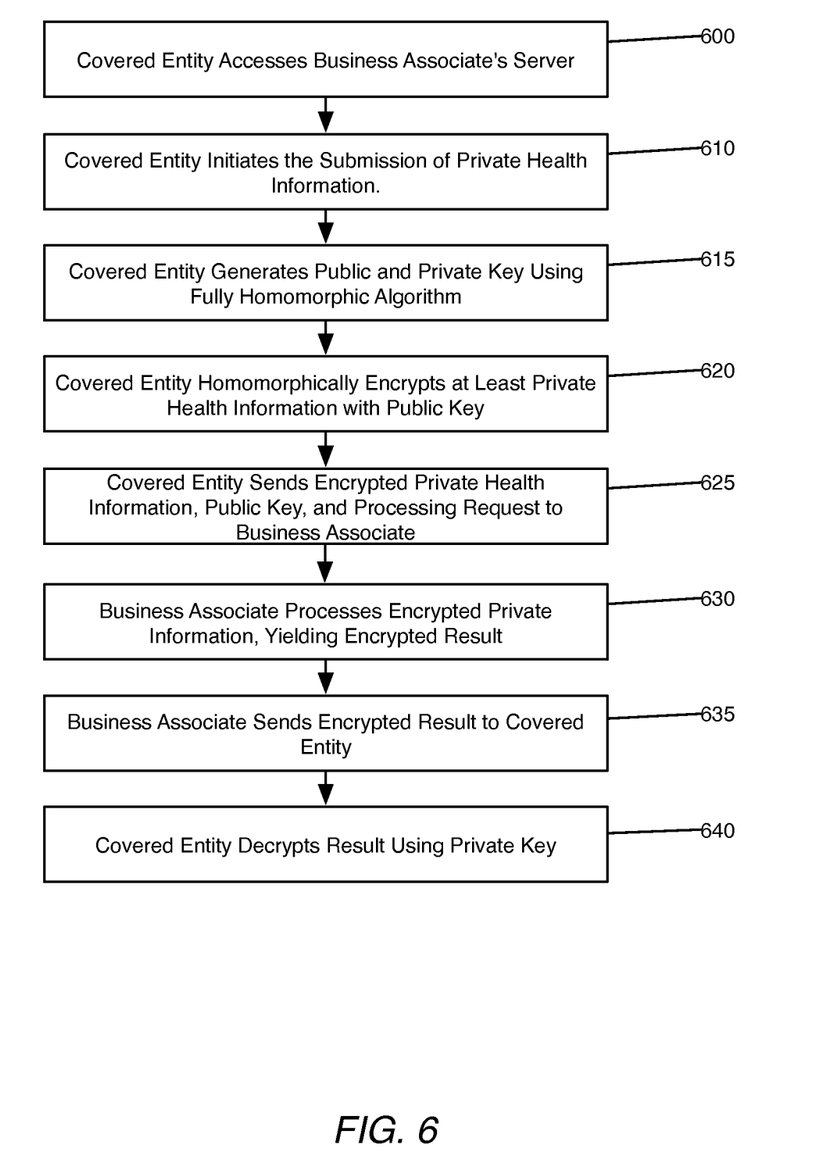
FIG. 6 depicts a flow chart according to an alternative embodiment of the present invention.

An alternative embodiment is depicted in FIGS. 5 and 6.

In the alternative embodiment, fully homomorphic encryption is performed by the covered entity 510 rather than by a trusted server. The alternative embodiment is suitable for covered entities that have the resources to perform fully homomorphic encryption with the appropriate level of security and speed.

At step 600, the covered entity 510 accesses a computer server operated by the business associate 560 through a connection 555. Connection 555 may be an internet connection, wireless connection, satellite connection, network connection, application programming interface ("API") provided by either the business associate 560 or the covered entity 510, or any other connection accomplished using standard protocols. The covered entity 510 may access the computer server of the business associate 560 in a variety of ways, such as by using an application developed by the business associate 560 and installed on a computer server of covered entity 510, or by means of an internet browser used by the covered entity 510.

At step 610, the covered entity 510 initiates the submission of private health information 505. The private health information 505 may have been collected from the patient 500 in written form, by using a modality such as a CT scan, or by a medical professional involved in the care and/or health records of the patient 500. Alternatively, the private health information 505 may have been collected from an authorized source other than the patient 500, such as a different covered entity. The private health information 505 may be stored and transferred according to the Digital Imaging and Communications in Medicine (DICOM) standard, published by the American College of Radiology and the National Electronic Manufacturers Association. Medical images, which may also constitute private health information 505, may be stored and retrieved using a Picture Archiving and Communication System (PACS).

The covered entity 510 may initiate the transmission of the private health information 505 in a variety of ways, depending on the needs of the covered entity 510 and the service requirements of business associate 560. For instance, if the covered entity 510 desires to have the private health information 505 processed quickly, the covered entity 510 may initiate the encryption and transmission of the private health information 505 once it is collected. In that case, the transmission may be initiated manually by a medical professional or other agent of the covered entity 510, or automatically by software associated with the computer network or modalities of the covered entity 510. Alternatively, if the covered entity 510 desires to have the private health information 505 processed according to predetermined schedule, the covered entity 510 may deploy a software application, such as a time-based job scheduler like cron, to initiate the encryption and transmission of private health information 505 at the appropriate time.

At step 615, the key generation module 520 of covered entity 510 generates a public key 525 and a private key 530 compatible with a fully homomorphic asymmetric key encryption scheme. Once the public key 525 and private key 530 have been generated, at step 620 the encryption module 535 of covered entity 510 fully homomorphically encrypts the private health information 505 (and, if required by the applicable homomorphic encryption scheme, one or more instances of private key 530) using at least one instance of public key 525, yielding encrypted private health information 545. Accordingly, as used herein and in the claims, the terms "encrypted private health information" and "fully homomorphically encrypted private health information" may refer to only private health information 505 that has been encrypted, or to both private health information 505 in encrypted form and one or more instances of private key 530 in encrypted form, as the context permits.

At step 625, the covered entity 510 sends the encrypted private health information 545, public key 525, and a request for processing the encrypted private health information 545 to the business associate 560 using connection 555. As would be appreciated by one of skill in the art, the encrypted private health information 545, public key 525, and the request for processing the encrypted private health information 545 could be sent to the business associate 560 separately, or simultaneously, and any or all could be in a compressed format to make their transmission more efficient.

After the business associate 560 receives the public key 525, encrypted private health information 545, and the request for processing the encrypted private health information 545, the processing module 565 of the business associate 560 processes the encrypted private health information 545 in accordance with the request using one or more functions at step 630. The processing of the encrypted private health information 545 may also be conducted according to a predetermined schedule by using software such as a time-based job scheduler like cron. Because the business associate 560 does not have access to the unencrypted private key 530, the business associate 560 cannot decrypt the encrypted private health information 545. Nevertheless, because the private health information has been encrypted with a fully homomorphic encryption scheme, the encrypted private health information 545 can be processed with any number of functions without decrypting it. These functions could be quite basic, such as performing simple mathematical operations like addition and multiplication, or rather complex, such as statistical analysis or string manipulation. The output of the processing step 630 is an encrypted result 570. This encrypted result 570, like the encrypted private health information 545, is encrypted according to the public key 525, and can be decrypted only by using the private key 530. Accordingly, the business associate 560 cannot decrypt the encrypted result 570.

If desired, the business associate 560 may store the encrypted private health information 545, the encrypted result 570, or both, in private health information database 575 for future use.

At step 635, the business associate 560 sends the encrypted result 570 to the covered entity 510. Finally, at step 640, the decryption module 540 of covered entity 510 decrypts the encrypted result 570 using the private key 530, yielding a decrypted result 550.

Figure 7:
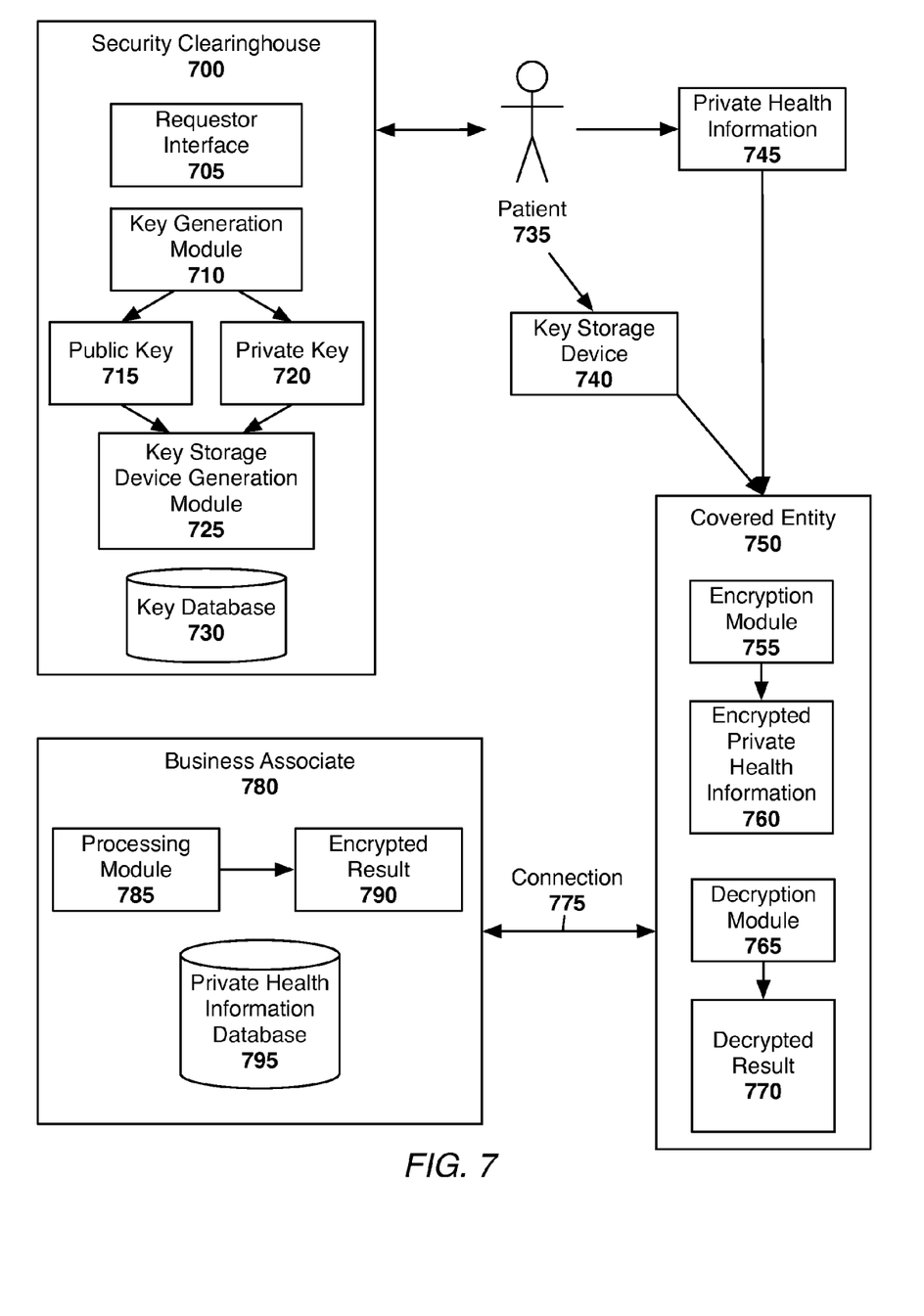
FIG. 7 depicts a system architecture according to a second alternative embodiment of the present invention.
Figure 8:
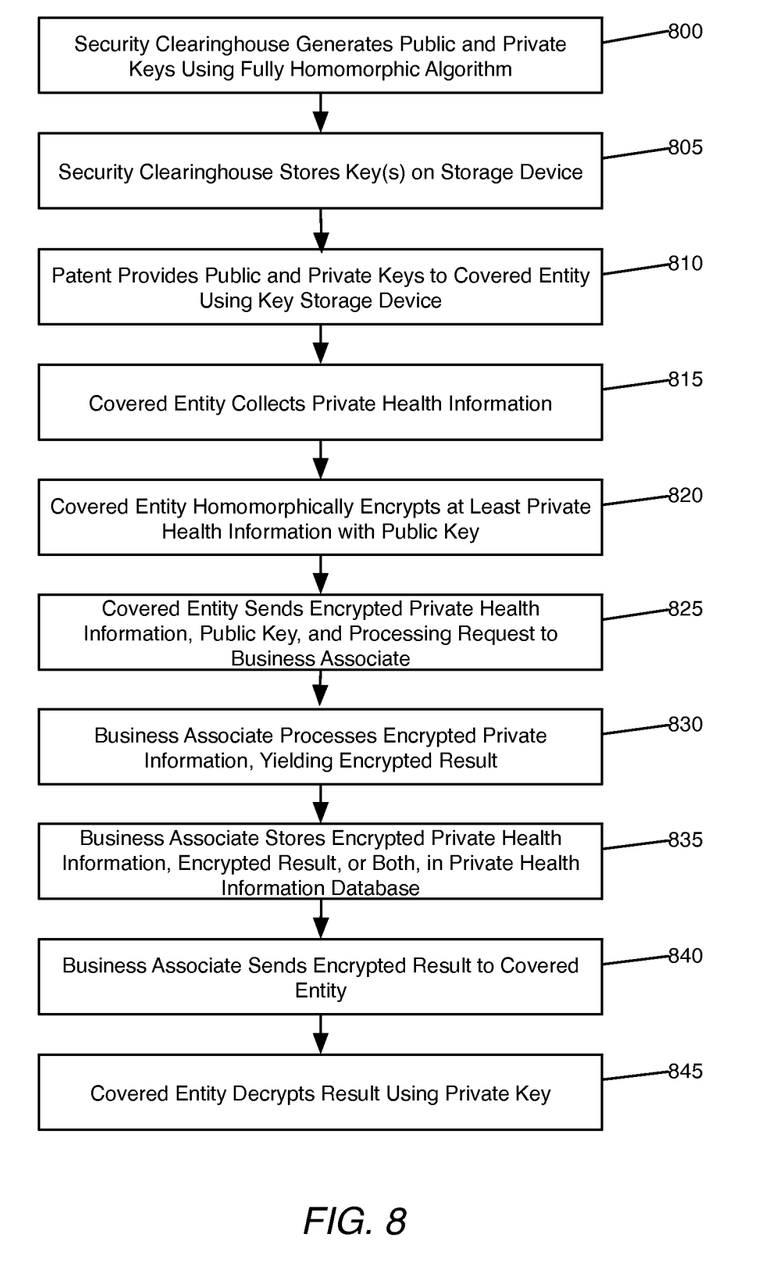
FIG. 8 depicts a flow chart according to a second alternative embodiment of the present invention.

A second alternative embodiment is depicted in FIGS. 7 and 8.

In the second alternative embodiment, at step 800, the key generation module 710 of a security clearinghouse 700 generates a public key 715 and a private key 720 compatible with a fully homomorphic asymmetric key encryption scheme. The security clearinghouse 700 may be any entity, server, or cluster of servers capable of generating public keys and private keys compatible with a fully homomorphic asymmetric key encryption scheme. The security clearinghouse 700 may be separate from the covered entity 750, or may be owned or operated by the covered entity 750. The security clearinghouse 700 may generate the public key 715 and private key 720 at the request of the covered entity 750, or at the request of the patient 735. The request may be made in person, or electronically through requestor interface 705, which may be a computer terminal, website, or other electronic interface accessed locally or via an internet connection, wireless connection, satellite connection, network connection, application programming interface ("API") provided by either the security clearinghouse 700, covered entity 750, or business associate 780, or any other connection accomplished using standard protocols. After the public key 715 and private key 720 have been generated, either or both keys may be stored in the key database 730 for future retrieval. Key database 730 may be an actual database, a hard drive, or other appropriate storage repository.

At step 805, the key storage device generation module 725 stores the private key 720, the public key 715, or both, on the key storage device 740. The key storage device 740 may be a portable device such as a magnetic stripe card, USB flash drive, compact disc, mobile device, tablet, laptop computer, or a security token, such as a time-synchronized security token. The key storage device 740 may also be a stationary device, such as a computer server. The key storage device 740 may be remotely accessible in order to enable the patient 735 or other authorized party to remotely retrieve the key or keys.

In the event that the request for key generation was submitted electronically through requestor interface 705, the security clearinghouse 700 may, instead of directly storing the key or keys onto the key storage device 740, send the key or keys to the patient 735, covered entity 750, or other requestor, using a connection such as an internet connection, wireless connection, satellite connection, network connection, application programming interface ("API"), or any other connection accomplished using standard protocols. In that case, the recipient of the key or keys could store them as appropriate.

At step 810, the patient 735 provides the key storage device 740 to the covered entity 750, who reads the public key 715, private key 720, or both, from the storage device 740. For example, the patient 735 may provide a magnetic stripe card to covered entity 750, who would use a magnetic stripe card reader to read the public key 715, private key 720, or both, from the card. The covered entity 750 may alternatively retrieve public key 715 from security clearinghouse 700 over a connection such as an internet connection, wireless connection, satellite connection, network connection, application programming interface ("API"), or any other connection accomplished using standard protocols.

At step 815, the covered entity 750 collects private health information 745 of the patient 735. The private health information 745 may be provided directly by the patient 735 and entered into a computer system of the covered entity 750, or it may be collected from the patient 735 using a modality such as a CT scan device, or by a medical professional involved in the care and/or health records of the patient 735. The private health information 745 may be stored and transferred according to the Digital Imaging and Communications in Medicine (DICOM) standard, published by the American College of Radiology and the National Electronic Manufacturers Association. Medical images, which may also constitute private health information 745, may be stored and retrieved using a Picture Archiving and Communication System (PACS). Alternatively, the private health information 745 may have been collected from an authorized source other than the patient 735, such as a different covered entity.

At step 820, the encryption module 755 of the covered entity 750 uses a fully homomorphic encryption scheme to fully homomorphically encrypt the private health information 745 (and, if required by the applicable homomorphic encryption scheme, one or more instances of the private key 720) using at least one instance of public key 715, yielding encrypted private health information 760. Accordingly, as used herein and in the claims, the terms "encrypted private health information" and "fully homomorphically encrypted private health information" may refer to only private health information 745 that has been encrypted, or to both private health information 745 in encrypted form and one or more instances of private key 720 in encrypted form, as the context permits.

If covered entity 750 does not desire to perform the fully homomorphic encryption itself, it may instead transmit the private health information 745 to a trusted server as described in the preferred embodiment of the present invention.

At step 825, the covered entity 750 (or a trusted server, if appropriate) sends the fully homomorphically encrypted private health information 760, public key 715, and a request for processing the fully homomorphically encrypted private health information 760 over connection 775 to the business associate 780. Alternatively, if the covered entity 750 desires to have the encrypted private health information 745 processed according to a predetermined schedule, the covered entity 750 may deploy a software application, such as a time-based job scheduler like cron, to initiate the encryption of the private health information 745, transmission of encrypted private health information 760, and/or transmission of the request, at the appropriate time. The business associate 780 may be any entity, computer server, or cluster of computer servers capable of processing fully homomorphically encrypted private health information. The business associate 780 may be owned and/or operated by the covered entity 750. Connection 775 may be an internet connection, wireless connection, satellite connection, network connection, application programming interface ("API") provided by either the covered entity 750 or the business associate 780, or any other connection accomplished using standard protocols. As would be appreciated by one of skill in the art, the public key 715, the encrypted private health information 760, and the request for processing the encrypted private health information 760 could be sent to the business associate 780 separately, or simultaneously, and any or all could be in a compressed format to make their transmission more efficient.

Alternatively, the business associate 780 may retrieve the public key 715 from the security clearinghouse 700 over a connection such as an internet connection, wireless connection, satellite connection, network connection, application programming interface ("API"), or any other connection accomplished using standard protocols.

After the business associate 780 receives the public key 715, encrypted private health information 760, and the request for processing the encrypted private health information 760, the processing module 785 of the business associate 780 processes the encrypted private health information 760 in accordance with the request using one or more functions at step 830. The processing of the encrypted private health information 760 may also be conducted according to a predetermined schedule by using software such as a time-based job scheduler like cron. Because the business associate 780 does not have access to the unencrypted private key 720, the business associate 780 cannot decrypt the encrypted private health information 760. Nevertheless, because the private health information has been encrypted with a fully homomorphic encryption scheme, the encrypted private health information 760 can be processed with any number of functions without decrypting it. These functions could be quite basic, such as performing simple mathematical operations like addition and multiplication, or rather complex, such as statistical analysis or string manipulation. The output of the processing step 830 is an encrypted result 790. This encrypted result 790, like the encrypted private health information 765, is encrypted according to the public key 715, and can be decrypted only by using private key 720. Accordingly, the business associate 780 cannot decrypt the encrypted result 790.

At step 835, the business associate 780 stores the encrypted private health information 760, the encrypted result 790, or both, in the private health information database 795 for future use.

At step 840, the business associate 780 sends the encrypted result 790 to the covered entity 750 (or a trusted server, if appropriate).

At step 845, the decryption module 765 of the covered entity 750 (or a trusted server, if appropriate) decrypts the encrypted result 790 using the private key 720, yielding a decrypted result 770. The covered entity 750 can then make appropriate use of the decrypted result 770, such as using it for the benefit of the patient 735, for administrative purposes, or for improving the overall quality of the services provided by the covered entity 750.

As long as the patient 735 controls the key storage device 740, the patient 735 can enable other third parties, such as other covered entities, to retrieve and decrypt the encrypted private health information 760 or the encrypted result 790 stored in the private health information database 795 of the business associate 780, or in a database controlled by the covered entity 750. Accordingly, the patient 735 can ensure that his or her private health information 745 is both portable and secure.

Although the foregoing description has referred to particular embodiments, variations and modifications of these embodiments may be made without departing from the principles and spirit of the invention, the scope of which is defined by the appended claims. For instance, as would be appreciated by one of skill in the art, various modules described in the specification as being included in the covered entity, trusted server, or business associate may alternatively be located outside these entities and may be operated by third parties. Similarly, although the specification describes the private health information as residing with the covered entity, that information may alternatively reside on a server or other repository. In addition, although the specification describes various tasks being performed by different parties, the responsibility for accomplishing those tasks may be differently apportioned between those parties, or may be apportioned among a number of parties in various possible configurations. In particular, terms like "receiving," "collecting," "sending," and "transmitting," as used in the specification and the claims, are sufficiently broad to mean and include each other, such that collecting or receiving information is the same as transmitting or sending it, and vice-versa. Further, although this specification may have presented some embodiments of methods with a particular sequence or order of steps, this is for illustrative purposes and other sequences and orders may be employed. Similarly, although the claims may present the steps in a particular sequence or order, the claims should not be read to require any particular sequence or order unless required by the context. As would be appreciated by one of skill in the art, still other variations and modifications of the described embodiments may be made without departing from the principles and spirit of the invention as defined by the claims.

What is claimed is:

1. A system for securing private health information, comprising:
    a first computer configured to encrypt at least said private health information using a public key compatible with a fully homomorphic encryption scheme, yielding fully homomorphically encrypted private health information; and
    a second computer configured to transmit said fully homomorphically encrypted private health information to a third party who does not possess an unencrypted private key corresponding to said public key, and to transmit a request to process said fully homomorphically encrypted private health information to said third party, wherein the fulfillment of said request results in an encrypted result capable of being decrypted with said private key, wherein said encrypted result is the output of processing said fully homomorphically encrypted private health information using at least one function incompatible with a partially homomorphic encryption scheme.

2. The system of claim 1, further comprising a modality for collecting said private health information.

3. The system of claim 1, further comprising a third computer configured to collect said private health information from a source authorized by a patient.

4. The system of claim 1, wherein said second computer is further configured to transmit said fully homomorphically encrypted private health information according to a predetermined schedule.

5. The system of claim 1, wherein said second computer is further configured to transmit said request according to a predetermined schedule.

6. The system of claim 1, wherein said second computer is further configured to transmit said fully homomorphically encrypted private health information according to a predetermined schedule, and to transmit said request according to a predetermined schedule.

7. The system of claim 1, wherein said second computer is further configured to transmit said fully homomorphically encrypted private information using an application programming interface.

8. The system of claim 1, wherein said private health information is in DICOM format.

9. The system of claim 1, wherein said at least one function is configured to perform statistical analysis of said private health information.

* * * * *